UNITED STATES PATENT OFFICE.

WALTER SCHOELLER AND WALTHER SCHRAUTH, OF BERLIN, GERMANY, ASSIGNORS TO FARBENFABRIKEN VORM. FRIEDR. BAYER & CO., OF ELBERFELD, GERMANY, A CORPORATION OF GERMANY.

ANTIFOULING PAINT AND VARNISH.

967,841.  Specification of Letters Patent.  Patented Aug. 16, 1910.

No Drawing.   Application filed May 20, 1909.  Serial No. 497,304.

*To all whom it may concern:*

Be it known that we, WALTER SCHOELLER and WALTHER SCHRAUTH, doctors of philosophy, chemists, citizens of the German Empire, residing at Berlin, Germany, have invented new and useful Improvements in Antifouling Paints and Varnishes, of which the following is a specification.

Our invention relates to the manufacture of preparations suitable as coatings, paints or varnishes which are remarkable for their good preservative properties. They prevent *e. g.* animal and vegetable growth from forming on the object painted, such as on ships' bottoms, etc. It has been hitherto attempted to attain this end by adding certain poisonous salts or strong bases to the paint material. The substances used are, however, either not sufficiently effective or quite useless. We have now found that by using for this purpose anhydrids of oxymercuric substituted organic acids the desired effect is produced in every respect in the best possible manner. The oxymercuric acetic acid anhydrid:

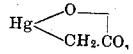

the oxymercuric butyric acid anhydrid:

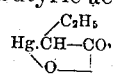

the oxymercuric salicylic acid anhydrid:

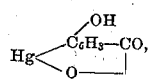

etc., may be used for the production of the preservative paints, etc. The latter product is known as the hydrargyrum salicylicum of the German *Pharmacopœia*, while the former preparations are made in accordance with the directions given in our German Patent No. 208,634 and in accordance with the publication in the *Berichte der Deutschen Chemischen Gesellschaft*, vol. 35, page 2870.

A useful preparation can be obtained for instance by mixing 1 part of one of the mentioned substances with 25 parts of a suitable coating material, such as varnishes, paints, etc., but the quantities and the solvents may be varied without altering thereby the nature of the invention.

We claim:—

1. As new articles of manufacture a coating material comprising an anhydrid of an oxymercuric substituted organic acid in conjunction with other suitable substances, substantially as described.

2. As a new article of manufacture a coating material comprising the oxymercuric salicylic acid anhydrid in conjunction with other suitable substances, substantially as described.

In testimony whereof we have hereunto set our hands in the presence of two subscribing witnesses.

WALTER SCHOELLER.
WALTHER SCHRAUTH.

Witnesses:
 HENRY HASPER,
 WOLDEMAR HAUPT.